United States Patent [19]
Horiuchi et al.

[11] 3,909,360
[45] Sept. 30, 1975

[54] PROCESS FOR PRODUCING INSOLUBILIZED ENZYME

[75] Inventors: Yoshifumi Horiuchi, Mishima; Shigeyuki Imamura, Shizuoka, both of Japan

[73] Assignee: Toyo Jozo Company, Ltd., Japan

[22] Filed: Mar. 18, 1974

[21] Appl. No.: 452,268

[30] Foreign Application Priority Data
Mar. 16, 1973 Japan.............................. 48-31263

[52] U.S. Cl. .............. 195/68; 195/63; 195/DIG. 11
[51] Int. Cl.² .......................................... C07G 7/00
[58] Field of Search.................. 195/63, 68, DIG. 11

[56] References Cited
OTHER PUBLICATIONS

Zaborsky, Immobilized Enzymes, published 1973 by CRC Press (Division of The Chemical Rubber Co.).

*Primary Examiner*—Lionel M. Shapiro
*Attorney, Agent, or Firm*—Craig & Antonelli

[57] ABSTRACT

Enzymes acting on glycerides or glycero-phosphatides, for example, lipase, phospholipase, or phosphatidate phosphatase are insolubilized by merely contacting an aqueous enzyme solution with a carrier selected from fatty acid esters of water-insoluble polysaccharides or derivatives thereof containing hydroxyl groups.

8 Claims, No Drawings

PROCESS FOR PRODUCING INSOLUBILIZED ENZYME

This invention relates to a process for producing insolubilized enzyme having substrate specificity for glycerides or glycero-phosphatides.

Enzymes have catalytic effect on chemical reactions. But, because they are generally soluble in water, there are various inconveniences such that enzyme catalysts are incorporated into reaction products and that repeated use of enzyme catalysts and continuous reaction are impossible. Accordingly, in order to overcome these drawbacks, there have been investigated insolubilization methods for respective enzymes without losing catalytic activity thereof.

As the result of various investigations performed by the present inventors on insolubilization of enzymes having substrate specificity for glycerides or glycero-phosphatides, it has now been found that said enzymes can specifically be adsorbed by a carrier selected from fatty acid esters of water-insoluble polysaccharides or derivatives thereof containing hydroxyl groups and that the enzymes thus adsorbed are rendered insoluble in water without losing enzyme activity.

The present invention, which has been accomplished based on the above knowledge, provides a process for producing insolubilized enzyme having substrate specificity for glycerides or glycero-phosphatides, which comprises contacting said enzyme with a carrier selected from fatty acid esters of water-insoluble polysaccharides or derivatives thereof containing hydroxyl groups.

In the present invention, the glycerides or the glycero-phosphatides for which the enzyme to be insolubilized has substrate specificity are represented by the following general formula:

wherein $R_1$ and $R_2$ are hydrogen or an acyl group, $R_1$ and $R_2$ being no hydrogen at the same time, and $R_3$ is hydrogen, an acyl group, a residual group of phosphoric acid, phosphoryl choline, phosphoryl ethanol amine, phosphoryl serine, or phosphoryl inositol.

Typical example of the enzyme having substrate specificity for glycerides is an enzyme which is generally called as lipase. For example, it may be obtained from the culture broth of microorganisms such as Genus Aspergillus, Genus Penicilium, Genus Rhizopus, Genus Mucor, Genus Absidia, Genus Candida, Genus Torulopsis, Genus Brettanomyces, Genus Bacillus, Genus Streptococcus, Genus Pseudomonas, Genus Clostridium or Genus Chromobacterium and from extract of animal pancreas.

Examples of the enzyme having substrate specificity for glycero-phosphatides are phospholipases such as phospholipase A, B, C and D, phosphatidate phosphatase; and the like.

The fatty acid esters of water-insoluble polysaccharides or derivatives thereof containing hydroxyl groups, which are used as carriers for insolubilizing enzymes in accordance with the present invention, are obtained by esterification of water-insoluble polysaccharides or derivatives thereof containing hydroxyl groups with reactive derivatives of fatty acids, particularly acid halides thereof, according to ordinary methods.

Examples of the water-insoluble polysaccharides or derivatives thereof containing hydroxyl groups are natural vegetable fibers such as cotten, linen, jute or Manila hemp; cellulose fibers such as regenerated fibers (e.g. viscose rayon); cellulose derivatives such as carboxymethyl-cellulose, phospho-cellulose, sulfomethyl-cellulose, sulfoethyl-cellulose, para-aminobenzyl-cellulose, aminoethyl-cellulose, diethylaminoethyl-cellulose, triethylaminoethyl-cellulose or guanidino-ethyl-cellulose; crosslinked gel of dextran-epichloro-hydrin (hereinafter referred to as dextran gel); dextran gel derivatives such as carboxymethyl-dextran gel, diethylaminoethyl-dextran gel or sulfoethyl-dextran gel; and agar.

The cellulose derivatives may be chemically synthesized by ordinary method (J. Am. Chem. Soc., 78, 751, 1956) or, alternatively, commercially available ion exchangers of cellulose may be used.

The dextran gel may be prepared by known methods (Chemical Experiment Course, vol. 2, edited by Japanese Chemical Society) from crystalline dextran and epichlorohydrin. Commercially available dextran gels having various crosslinking degree, i.e. "Sephadex" (trade name), may also conveniently be used. As dextran gel derivatives, products prepared by carboxymethylation, diethylaminoethylation or sulfoethylation of dextran gels may be useable. But, without recourse to such preparation, commercially available CM-Sephadex, DEAE-Sephadex or SE-Sephadex may directly be put into use.

As fatty acids to be used for esterification, saturated or unsaturated fatty acids having carbon atoms of 6 or more are advantageously used. These fatty acids may have either branched or straight chain structures. A mixture containing several kinds of fatty acids having different carbon atoms may also be used.

According to the present invention, the enzyme having substrate specificity for glycerides or glycero-phosphatides is immobilized by merely contacting a solution containing said enzyme with a carrier selected from fatty acid ester of polysaccharide as mentioned above. The treatment, therefore, may be performed in batchwise system or column.

The treatment may be carried out at a temperature and pH which may be varied freely, so far as no detrimental effect on the enzyme activity is caused. It is particularly preferred that the treatment is carried out at 20° to 30°C and at pH of 7 to 8.

Because the fatty acid esters of polysaccharide are poor in affinity with water, they are preferably subjected to pre-treatment with hydrophilic organic solvents such as acetone or lower alcohols.

The enzyme thus insolubilized by adsorption on fatty acid ester of said polysaccharide is then separated by decantation or filtration.

In the process of the present invention, crude enzyme containing impurities may directly be subjected to the treatment, so far as they will not badly affect adsorption, since the enzyme having substrate specificity for glycerides or glycero-phosphatides is adsorbed specifically by fatty acid esters of water-insoluble polysaccharides or derivatives thereof. Furthermore, as the mechanism of adsorption is different from that by cellulose derivatives having so called ion-exchange ability such as DEAE-cellulose or CM-cellulose, the salt concentration affects little influence on the adsorption of the enzyme.

The present invention is further explained with reference to the following Examples.

EXAMPLE 1

Three grams of dry gauze and 10 ml of palmitic acid chloride were added into 80 ml of pyridine and the reaction was carried out at 30°C under stirring for 12 hours. To the reaction mixture was added 100 ml of chloroform-ethanol mixture (1 : 1) and the reaction product was collected by filtration. The product was washed again with 100 ml of chloroform-ethanol mixture (1 : 1), further washed with 100 ml of ethanol and dried to obtain 3.2 g of palmitoyl ester of gauze.

Two grams of the palmitoyl ester of gauze were immersed in 50% aqueous acetone solution, packed in a column of 1.2 × 9 cm and washed with water. Then, 40 ml (40 U/ml) of an aqueous solution of lipase (obtained according to the method as described in Japanese patent publication No. 29787/71) was passed through the column, followed again by washing with water. The column contents were taken out and dried to obtain 2 g (730 U/g) of insolubilized lipase.

EXAMPLE 2

Three grams of agar powders and 10 ml of caproic acid chloride were added into 40 ml of pyridine-acetone mixture (1 : 1). After the reaction was conducted at room temperature under stirring for 10 hours, the reaction product was washed twice with 100 ml of chloroform-ethanol mixture (1 : 1), further washed with 50 ml of ethanol and dried to obtain 3.9 g of caproyl ester of agar.

Two grams of the caproyl ester of agar were immersed in 50% aqueous acetone solution, and 50 ml (40 U/ml) of an aqueous solution of the same lipase as used in Example 1 was added thereto. After stirring for 10 minutes, insoluble products were collected by filtration, washed with water and dried to obtain 2 g (820 U/g) of insolubilized lipase.

EXAMPLE 3

By the use of the carriers as set forth below, insolubilized lipases were obtained according to the similar treatments as in Example 1 or Example 2.

The carriers herein used were prepared similarly as in Example 1 or Example 2 by esterification of various water-insoluble polysaccharides or derivatives thereof containing hydroxyl groups with respective acid chlorides of fatty acids.

| Carrier | Lipase adsorption ability (U/g) |
| --- | --- |
| Palmitoyl ester of Sephadex G-25 | 720 |
| Oleoyl ester of Sephadex G-25 | 840 |
| Eraidoyl ester of Sephadex G-25 | 600 |
| Palmitoyl ester of CM-Sephadex | 640 |
| Palmitoyl ester of SE-Sephadex | 600 |
| Palmitoyl ester of DEAE-Sephadex | 560 |
| Caproyl ester of defatted cotton | 730 |
| Palmitoyl ester of cellulose | 940 |
| Caproyl ester of CM-cellulose | 1000 |
| Lauroyl ester of CM-cellulose | 1010 |
| Palmitoyl ester of P-cellulose | 840 |
| Lauroyl ester of DEAE-cellulose | 930 |
| Caproyl ester of DEAE-cellulose | 880 |

EXAMPLE 4

0.5 Gram of palmitoyl ester of gauze cut in 1 cm square was immersed in an acetone solution and then, after washing with water, 10 ml (500 U) of lipase solution (R. delemer Fine Grade; produced by Seikagaku Kogyo Co.) was added thereto. After stirring the mixture for 2 minutes, insoluble product was collected by filtration. The product was washed with water and dried to obtain 0.5 g of insolubilized lipase (600 U/g).

The insolubilized lipase thus obtained exhibits activity values as shown below.

Table 1

| Lipase activity before insolubilization | | Carrier (weight after adsorption of enzyme) | Activity of insolubilized lipase | Activity of re-used insolubilized lipase |
| --- | --- | --- | --- | --- |
| Method A | Method B | | Method B | Method B |
| 12 U | 0.13 | Palmitoyl ester of gauze (20mg) | 0.09 | 0.06 |
| 24 U | 0.18 | Palmitoyl ester of gauze (40mg) | 0.15 | 0.12 |

In the above Table, activity of lipase was estimated according to the following methods.

METHOD A a. Preparation of Emulsion

One liter of deionized water containing 18.5 g of a polyvinyl alcohol (Kuraray Poval No. 117; trade name, Kuraray Co.) and 1.5 g of another polyvinyl alcohol (Kuraray Poval No. 205; trade name, Kuraray Co.) was warmed with stirring at 75° to 85°C for 1 hour, thereafter cooled and filtered to prepare a PVA solution.

Into a homogenizer vessel of stainless steel were charged 75 ml of the PVA solution and 23 g of olive oil and, after homogenization at 11000 r.p.m. at 0° to 5°C for 10 minutes, PVA-olive oil emulsion was prepared. This emulsion must put into use within 24 hours after it was left to stand at 0° to 5°C for 1 hour.

b. Composition of the Reaction Mixture and Operational Procedure

| Composition | PVA emulsion | 5 ml |
| --- | --- | --- |
| | 0.1 M phosphate buffer solution (pH 7.0) | 2 ml |
| | Enzyme solution | 1 ml |

Into a test tube of 24 mm in diameter and 200 mm in height were introduced 2 ml of the phosphate buffer solution and 5 ml of the PVA emulsion. After stirring for 3 seconds with a vibrator, pre-incubation was performed at 37°C for 10 minutes. Then, 1 ml of the enzyme solution was added to this mixture and, after stirring with a vibrator for about 3 seconds, the reaction was initiated. After 20 minutes, the reaction was terminated by addition of 20 ml of ethanol-acetone mixture (1 : 1).

The free fatty acids in the resulted reaction mixture were titrated with 0.05 N NaOH, while bubbling the mixture by passing nitrogen gas therethrough, by the use of 3 to 5 drops of 1% alcoholic phenolphthalein as indicator. On the other hand, the reaction mixture without enzyme solution was mixed with 20 ml of the ethanol-acetone mixture, followed by addition of the enzyme solution, to prepare control mixture, which was titrated similarly as mentioned above.

The difference between the both titration values corresponds to the amount of fatty acids liberated by lipase.

c. Calculation of Unit of Enzyme Activity

The amount of enzyme which liberates 1 μ mole of fatty acids per minute at 37°C was defined as one unit.

Accordingly, the activity unit of lipase was calculated from the titration values according to the following equation:

$$\text{Lipase unit } (U) = \frac{\text{Difference in titration values}}{\text{Sample amount in 1 ml of enzyme solution}} \times 2.5$$

On the other hand, another assay method without use of surfactant as described below was adapted for estimation of activity of insolubilized enzyme, because enzymes were sometimes eluted from the carrier in the insolubilized lipase by the presence of surfactant. According to this method, activity of lipase was indicated in terms of millimoles of fatty acids liberated per hour.

METHOD B

Four ml of 0.01 M phosphate buffer solution (pH 7.0) and 1 ml of olive oil were accurately measured into a L-type test tube, then one ml of the sample enzyme solution was added thereto, and the reaction was carried out at 37°C for 1 hour under shaking.

Subsequently, the reaction was terminated by addition of 20 ml of acetone-ethanol mixture (1 : 1) and the mixture was titrated with 0.05 N NaOH solution by the use of 3 drops of 1% alcoholic phenolphthalein as indicator. The amount of fatty acids liberated was determined from the value, resulting by subtracting from this titration value the titration value obtained separately without addition of 1 ml of the enzyme solution.

EXAMPLE 5

0.5 Gram of palmitoyl ester of gauze was immersed in acetone and, after washing with water, added to 10 ml of an aqueous solution containing 150 mg of lipase (hog pancreatin, B grade; produced by Calbiochem Co.). After the mixture was stirred for one minute, insoluble product was collected by filtration. The product was washed with water and thereafter dried to obtain 0.5 g (400 U/g) of insolubilized lipase.

The insolubilized lipase exhibits activity values as shown in Table 2, wherein assay methods are the same as in Table 1.

Table 2

| Lipase activity before insolubilization | | Carrier (weight after adsorption of enzyme) | Activity of insolubilized lipase |
|---|---|---|---|
| Method A | Method B | | Method B |
| 8 U | 0.037 | Palmitoyl ester of gauze (20 mg) | 0.025 |
| 24 U | 0.082 | Palmitoyl ester of gauze (60 mg) | 0.091 |

EXAMPLE

In this Example, activities of lipase samples prepared according to the method as described in Japanese patent publication No. 29787/71 were compared with those of the samples insolubilized according to the method of the present invention. The result is shown in Table 3, wherein assay methods are the same as in Table 1.

Table 3

| Lipase activity before insolubilization | | Carrier (weight) after adsorption of enzyme) | Activity of insolubilized lipase | Activity of re-used insolubilized lipase |
|---|---|---|---|---|
| Method A | Method B | | Method B | Method B |
| 16 U | 0.19 | Palmitoyl ester of gauze (20 mg) | 0.40 | — |
| 32 U | 0.27 | of gauze (40mg) | 0.50 | 0.53 |
| 64 U | — | of gauze (80mg) | 0.76 | 0.78 |
| 6 U | 0.07 | Palmitoyl ester of cellulose (5mg) | 0.27 | — |
| 60 U | — | of gauze (50mg) | 0.77 | 0.70 |

EXAMPLE 7

2.0 Grams of palmitoyl ester of cellulose were immersed in 50% aqueous acetone solution and, after being packed in a column of 1.2 × 9 cm, washed thoroughly with deionized water.

On the other hand, 10 mg of lyophilized viper venom (phospholipase A: 35 U/mg) was dissolved in 30 ml of 10 mM tris-HCl buffer solution (pH 8.0) and centrifuged at 5,000 r.p.m. for 5 minutes. The resulting supernatant solution was charged into the above column packed with palmitoyl ester of cellulose. Then, the column was washed thoroughly with deionized water and thereafter the palmitoyl ester of cellulose was taken out from the column, followed by drying to obtain 2.0 g (160 U/g) of insolubilized phospholipase A.

The insolubilized phospholipase A obtained by the above method exhibited the following activity.

Table 4

| Enzyme activity before insolubilization | | Palmitoyl ester of cellulose | Enzyme activity after insolubilization | Enzyme activity at the time of re-use |
|---|---|---|---|---|
| Method A | Method B | | Method B | Method B |
| 8 U | 0.57 | 50 mg | 0.35 | — |
| 16 U | 0.75 | 100 mg | 0.57 | 0.61 |

In Table 4, assay of enzyme activity was carried out according to the following methods:

Method A

A reaction mixture containing 1 μ mole of purified egg yolk lecithin, 15 μ moles of NaCl, 2.3 μ moles of $CaCl_2$, 0.013 μ mole of EDTA, 0.15 ml of ethyl ether and 1.5 mg of Tryton X-100 per 1.4 ml was agitated vigorously with a magnetic stirrer for 5 minutes. Then, 1.4 ml of the substrate mixture was adjusted to pH 8.0 with 0.01 N NaOH in a titration vessel for automatic titration recording apparatus (TTT/SBR; Radiometer Co.).

The reaction was initiated by adding 0.1 ml of enzyme solution to the thus obtained mixture. The reaction rate was determined by titrating the fatty acids liberated with 0.01 N NaOH in the presence of nitrogen gas, while maintaining pH at 8.0.

Enzyme activity capable of liberating 1 $\mu$ mole of fatty acids per minute at 26 °C under the above conditions was defined as one unit (U).

METHOD B

A reaction mixture (2.0 ml) containing 1 ml of a lecithin emulsion (4.0 $\mu$ moles/ml), which had been subjected to supersonic treatment for 10 minutes, and 2 $\mu$ moles of $CaCl_2$ was adjusted to pH 8.0 with 0.01 N NaOH and thereafter insolubilized phospholipase A was added thereto to carry out the reaction at 26°C for 1 hour under stirring. After the reaction was over, the reaction rate was determined by titration with 0.005 N NaOH to pH 8.0. The enzyme activity was shown in terms of $\mu$ moles of fatty acids liberated per hour.

EXAMPLE 8

Bacillus cereus IAM-1208 was inoculated to 100 ml of a liquid culture medium (pH 7.0) containing 1 g of peptone, 1 g of meat extract and 0.5 g of NaCl and shaking culture was performed at 30°C for 20 hours. After completion of cultivation, the culture broth was subjected to centrifugal separation (5000 r.p.m., 20 minutes, 0°C) to remove bacteria cells. The resulting supernatant was brought to 70% saturated ammonium sulfate solution and the precipitate formed was collected by centrifugal separation (5000 r.p.m., 20 minutes, 0°C). The precipitate was dissolved in 0.01 M tris-HCl buffer solution (pH 7.5) of 1/10 volume of the supernatant and stored at −10°C to provide a solution containing phospholipase C.

2.0 Grams of palmitoyl ester of cellulose were immersed in ethanol, packed in a column of 1.2 × 10 cm and washed thoroughly with water. 100 ml of the solution containing phospholipase C was charged into the column at the velocity of 150 ml/hour.

Then, after washing with 0.01 M tris-HCl buffer solution (pH 7.5), the cellulose was taken out from the column and dried to obtain 2 g of insolubilized phospholipase C (1400 U/g).

The insolubilized phospholipase C obtained by the above method exhibited the following activity.

Table 5

| Enzyme activity before insolubilization | Palmitoyl ester of cellulose | Enzyme activity after insolubilization | Enzyme activity at the time of re-use |
|---|---|---|---|
| Method A | Method B | | Method B | Method B |
| 0.14 U | 1.5 | 0.1 mg | 0.4 | — |
| 0.28 U | 2.6 | 0.2 mg | 0.8 | — |
| 2.8 U | 10.0 | 2.0 mg | 2.0 | 1.6 |

In Table 5, assay of enzyme activity was carried out according to the following methods:

METHOD A

A reaction mixture, containing 5.2 $\mu$ moles of egg yolk phosphatide, 5 $\mu$ moles of $CaCl_2$, 300 $\mu$ g of sodium deoxycholate and 100 $\mu$ moles of tris-HCl buffer (pH 7.5) per 1.9 ml, was subjected to supersonic treatment at 9 KC for 10 minutes, 180 W (Kubota Insonater 200 M). To 1.9 ml of this solution was added 0.1 ml of enzyme solution and incubation was performed at 37°C for 30 minutes.

After 30 minutes, the reaction was terminated by addition of 0.9 ml of 2.5% lauryl benzene sulfonate and then 0.1 ml of E. coli alkaline phosphatase (40 units: enzyme amount capable of hydrolyzing 40 $\mu$ moles of p-nitrophenyl phosphate at 37°C, at pH 7.5 per minute), which had been prepared as described below, was added to carry out the reaction at 37°C for 30 minutes. The reaction was terminated by addition of 1 ml of trichloroacetic acid and the resulting mixture was supplemented with 1 ml of 5% barium acetate to precipitate lauryl benzene sulfonate and unaltered phosphatide. Each 2 ml of the filtrate obtained by removing the precipitate with filter paper was sampled in a test tube for centrifugation, and the quantity of inorganic phosphate was determined from the absorption at 720 m$\mu$ by the method of Allen modified by Nakamura (Michinori Nakamura, Journal of Japanese Agricultural Chemical Society 24, 1, 1950). Before the colorimetric analysis, the precipitate of barium sulfate formed was removed by centrifugation (3000 r.p.m., 10 minutes). The enzyme unit was represented as one unit by the activity liberating 1 $\mu$ mole of phosphorylcholine per hour under the above conditions.

E. coli alkaline phosphatase was prepared in the following manner. E. coli W 3747 $F_{13}^+$ was inoculated to the medium of A. Torriani [A. Torriani; Methods in Enzymology 12 (B) 212 (1968)]. After shaking culture was performed at 37°C for 20 hours, bacteria cells were collected by centrifugation (5000 r.p.m., 20 minutes, 0°C). The bacteria cells were washed twice with 10-fold weights of cold 0.01 M tris-HCl buffer solution (pH 7.5) suspended in 3-fold weights of the same buffer solution and subjected to supersonic treatment at 0°C for 15 minutes (9 KC, 180 W), followed by centrifugal separation (7000 r.p.m., 20 minutes, 0°C). The supernatant solution thus obtained was adjusted to 0.01 M concentration of $MgSO_4$ and then subjected to heat treatment at 70°C for 10 minutes. Immediately thereafter, the treated supernatant was cooled on ice bath and, after 30 minutes, subjected to centrifugal separation (7000 r.p.m.; 20 minutes, 0°C). The supernatant was collected and the precipitate formed therefrom by 70% saturated ammonium sulfate was dissolved in 0.01 M tris-HCl buffer solution (pH 7.5) 1.5 times as much as the wet weight of bacteria cells, and stored at −10°C to provide for determination of quantity of phosphoryl choline and phosphoryl ethanolamine formed by the phospholipase C reaction.

METHOD B

In this method, the same procedure of the Method A as described above was performed except that the enzyme reaction was carried out in a L-type test tube under shaking in a reaction mixture without sodium deoxycholate. The enzyme activity was represented by $\mu$ moles of phosphoryl choline and ethanolamine liberated per hour.

EXAMPLE 9

To 100 g of finely cut cabbage at portions rich in chlorophyll was added 100 ml of cold deionized water. After stirring by means of a whirling blender for 5 minutes, the mixture was filtered with gauze. The filtrate was subjected to centrifugation (10,000 r.p.m., 20 minutes, 0°C) and equal amount of cold acetone was added to the formed supernatant solution. The precipitate formed was dissolved in 12 ml of 0.01 M phosphate buffer solution (pH 6.0) and thereafter lyophilized to obtain crude enzyme powders of phospholipase D (3.6 U/mg). For assay of enzyme activity, a solution of 0.8 mg/ml of the enzyme was used.

2.0 Grams of palmitoyl ester of cellulose were immersed in ethanol, packed in a column of 1.2 × 10 cm and washed with 0.01 M phosphate buffer solution (pH 7.0). On the other hand, an enzyme solution of 10 ml of 0.001 M phosphate buffer (pH 7.0) containing 20 mg (3.6 U/mg) of the above phospholipase D powders was applied to the aforesaid column. Then, after washing with deionized water adjusted to pH 7.0, the palmitoyl ester of cellulose was taken out from the column and dried to obtain 2.0 g (28 U/g) of insolubilized phospholipase D.

The insolubilized phospholipase D thus obtained showed the activity as set forth in the following Table.

Table 6

| Enzyme activity before insolubilization | | Palmitoyl ester of cellulose | Enzyme activity after insolubilization | Enzyme activity at the time of re-use |
|---|---|---|---|---|
| Method A | Method B | | Method B | Method B |
| 2.8 U | 0.43 | 100 mg | 0.36 | — |
| 5.6 U | 0.58 | 200 mg | 0.52 | 0.50 |

In Table 6, the assay of enzyme activity was carried out according to the following methods:

METHOD A a. Preparation of Substrate Emulsion

Ten egg yolks were blended in 500 ml of cold acetone with a whirling blender and thereafter left to stand. The precipitate formed thereby was collected by filtration, washed twice with 200 ml of cold acetone, and admixed with 300 ml of chloroform-methanol (1 : 1) mixture to extract phosphatide. The insoluble portion was separated by filtration.

The extraction procedure with this mixture was repeated twice. The extract was concentrated under reduced pressure until the solvent was removed, whereupon 300 ml of acetone was added to the concentrate, and stood for 24 hours at −10°C. The precipitate formed was collected by filtration, dissolved in 100 ml of ethyl ether and stored at −10°C to provide egg yolk phosphatide (170 $\mu$ moles of phosphatide/ml).

5 $\mu$ moles of this egg yolk phosphatide were mixed with 0.1 ml of ethyl ether, 100 $\mu$ moles of acetate buffer solution (pH 5.5), 200 $\mu$ moles of $CaCl_2$ and deionized water to make the total volume of 1.5 ml. The mixture was subjected to supersonic treatment at 0°C for 10 minutes to prepare the substrate emulsion.

b. Procedure

To 1.5 ml of the substrate emulsion prepared in the above manner was added 0.5 ml of enzyme solution. After thorough mixing, 0.5 ml of ethyl either was quickly layered, whereby the reaction was carried out at 37°C for 20 minutes. After the reaction was over, 1.0 ml of 30% trichloroacetic acid was added to the reaction mixture. After the mixture was left to stand at 0°C for 10 minutes 2 ml of deionized water was added thereto and the precipitate was removed by filtration. The filtrate was kept at 60°C for 10 minutes to remove ethyl ether. After cooling on ice bath 2.0 ml of the filtrate, 0.2 ml of 15.7% $I_2$ - 20% KI solution were added thereto. The mixture was left to stand for 20 minutes and then subjected to centrifugal separation (3000 r.p.m., 10 minutes, 5°C). The supernatant solution was removed by aspiration by the use of capillary. the precipitate was dissolved in 10 ml of 1,2-dichloro ethane. The amount of choline was measured by the increase in absorbance at 365 m$\mu$.

The enzyme activity was represented as one unit by the activity liberating 1 $\mu$ mole of choline per hour under the above conditions.

METHOD B

In this method, the same procedure of the Method A as described above was applied except that the enzyme reaction was carried out in a L-type test tube in the absence of ethyl ether. The enzyme activity was represented by $\mu$ moles of choline liberated per hour.

EXAMPLE 10

*Streptomyces mirabilis* (the Institute for Microbial Industry and The Agency of Industrial Science & Technology, Japan as FERM-P No. 2450) was inoculated to a liquid medium (pH 6.5) containing 1 g of peptone (produced by Kyokuto Seiyaku Kogyo Co.), 0.5 g of glycose, 0.5 g of corn starch, 0.3 g of NaCl and 0.05 g of $MgSO_4$. Shaking culture was conducted at 26°C for 3 days and the culture broth was filtered. To 80 ml of the filtrate were added 1.6 g of barium acetate and 2.4 g of NaCl. the precipitate thereby formed was removed by centrifugation (5000 r.p.m., 10 minutes) and the supernatant solution was provided as crude phosphatidate phosphatase solution (0.18 U/ml).

1.0 Gram of dry palmitoyl ester of cellulose was immersed in 50% ethanol solution, packed in a column of 1.2 × 9 cm and then washed thoroughly with deionized water. Into the column was applied 45 ml of the crude phosphatidate phosphatase solution as prepared above at a flowing rate of 150 ml/hour. Then, the column was washed successively with 10 ml of 1.5% NaCl solution, 10 ml of 0.75% NaCl solution and 50 ml of 0.1% NaCl solution. The palmitoyl ester of cellulose was taken out from the column to obtain 1.5 g (wet weight; 5.1 U/g) insolubilized phosphatidate phosphatase, which had activity as shown in the following Table.

Table 7

| Enzyme activity before insolubilization | | Palmitoyl ester of cellulose | Enzyme activity after insolubilization | Enzyme activity at the time of re-use |
|---|---|---|---|---|
| Method A | Method B | | Method B | Method B |
| 0.025 U | 0.026 | 5 mg | 0.025 | — |
| 0.050 U | 0.055 | 10 mg | 0.043 | 0.044 |
| 0.100 U | 0.098 | 20 mg | 0.077 | — |

In Table 7, the enzyme activity was assayed according to the following methods:

Method A a. Preparation of Substrate Emulsion

One ml of phosphatidic acid (51 $\mu$ mole/ml) was put in a supersonic treatment vessel followed by volatilizing ethyl ether with the aid of dryer and then, mixed with 5 ml of purified water. The mixture was further subjected to supersonic treatment (9 KC, 180 W) at 0°C for 10 minutes to prepare substrate emulsion.

The aforesaid phosphatidic acid was prepared in the following manner. 20 ml of refined lecithin (73 $\mu$ mole/ml; ethyl ether solution) was sampled in a 200 ml Erlenmeyer's flask. After removal of ethyl ether, 10 ml of 1 M acetate buffer solution (pH 5.5), 10 ml of 1 M CaCl$_2$ and 40 ml of deionized water were added to the flask, and mixed thoroughly. After addition of 100 mg of phospholipase D (lyophilized powders) from cabbage, 10 ml of ethyl ether was added thereto and stationary reaction was carried out at 30°C for 20 hours. The reaction mixture was transferred into a separating funnel, admixed thoroughly with 250 ml of methanol and 125 ml of chloroform, and subsequently with 125 ml of deionized water. After the mixture was left to stand for 30 minutes, the chloroform layer was separated therefrom. To the aqueous layer was added 50 ml of chloroform to extract phosphatidic acid again. The extract was combined with the initial extract and 100 ml of benzene was added thereto. Then, the mixture was concentrated under reduced pressure. The residue was dissolved in 5 ml of chloroform. To this chloroform solution was added 45 ml of methanol and the mixture was left to stand at 4°C for 20 hours. The precipitate formed was collected by centrifugation (10,000 r.p.m., 10 minutes, 4°C). The precipitate was dissolved again in 5 ml of chloroform and 45 ml of methanol. After the mixture was left to stand at 4°C for 20 hours, it was subjected to centrifugation. The precipitate formed was collected, dissolved in 15 ml of ethyl ether and transferred into a separating funnel. 20 ml of 0.1 N HCl was added to the funnel and, after thorough mixing, the mixture was left to stand for 30 minutes. The ethyl ether layer was separated and stored at −10°C (51 $\mu$ mole/ml). The purity of the phosphatidic acid determined according to thin-layer chromatography was 95%.

b. Procedure

Reaction was started by the addition of 0.1 ml enzyme solution into 0.9 ml of a reaction mixture containing 0.1 ml of the phosphatidic acid as described above, 0.1 ml of 0.5 M acetate buffer solution, 0.1 ml of 0.01 M CaCl$_2$ solution and 0.6 ml of deionized water. The reaction was carried out at 37°C for 30 minutes and terminated by addition of 1.0 ml of 10% trichloroacetic acid. Then, 1.0 ml of 1% bovine serum albumin solution was added to the mixture and mixed well. Unaltered substrate and protein were removed by centrifugation (3000 r.p.m., 10 minutes). The supernatant solution was analyzed similarly as described in method A in Example 8.

The enzyme activity was represented as one unit by the activity liberating 1 $\mu$ mole of inorganic phosphoric acid at 37°C per minute under the above conditions.

METHOD B

In this method, assay was performed in the same manner as in Method A except that enzyme reaction was carried out in a L-type test tube at 37°C for 10 minutes under shaking.

EXAMPLE 11

Insolubilized phospholipase A, C, D and phosphatidate phosphatase were obtained in the same manners as described in Examples 7 to 10, respectively, except that various carriers were used in place of the palmitoyl ester of cellulose.

The results are shown in the following Table.

Table 8

| Enzyme | Carrier | Activity of insolubilized enzyme |
|---|---|---|
| | | (note 1) |
| Phospholipase A | Oleoyl ester of gauze | 0.28 |
| | Palmitoyl ester of gauze | 0.21 |
| | Palmitoyl ester of CM cellulose | 0.30 |
| | Palmitoyl ester of Sephadex G-25 | 0.18 |
| | Caproyl ester of agar | 0.33 |
| | | (note 2) |
| Phospholipase C | Palmitoyl ester of bleached cotton | 1.5 |
| | Oleoyl ester of gauze | 1.8 |
| | Palmitoyl ester of DEAE cellulose | 2.3 |
| | Eraidoyl ester of CM cellulose | 1.6 |
| | Oleoyl ester of CM Sephadex | 1.5 |
| | | (note 3) |
| Phospholipase D | Caproyl ester of defatted cotton | 0.20 |
| | Palmitoyl ester of p-aminobenzyl cellulose | 0.32 |
| | Eraidoyl ester of agar | 0.30 |
| | | (note 4) |
| Phosphatidate phosphatase | Oleoyl ester of Sephadex G-25 | 0.040 |
| | Palmitoyl ester of CM-cellulose | 0.038 |
| | Caproyl ester of agar | 0.042 |

(note 1): $\mu$ moles of fatty acids liberated per hour by 50 mg of insolubilized phospholipase A at 26°C.
(note 2): $\mu$ moles of phosphoryl choline liberated at 37°C per hour by 2 mg of insolubilized phospholipase C.
(note 3): $\mu$ moles of choline liberated at 37°C per hour by 100 mg of insolubilized phospholipase D.
(note 4): $\mu$ moles of inorganic phosphate liberated at 37°C per minute by 10 mg of insolubilized phosphatidate phosphatase.

The carriers used in this example were prepared by the methods as disclosed in Japanese Patent Applications No. 90800/72, No. 90801/72, No. 92600/72 and No. 92601/72.

What we claim is:

1. A process for producing insolubilized enzyme, which comprises contacting an aqueous solution of an enzyme having substrate specificity for glycerides or glycero-phosphatides represented by the formula:

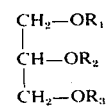

wherein $R_1$ and $R_2$ are hydrogen or an acyl group, $R_1$ and $R_2$ being not hydrogen at the same time, and $R_3$ is hydrogen, an acyl group, a residual group of phosphoric acid, phosphoryl choline, phosphoryl ethanol amine, phosphoryl serine, or phosphoryl inositol, with a carrier selected from esters of water-insoluble polysaccharides or derivatives thereof containing hydroxyl groups with fatty acids having at least 6 carbon atoms.

2. A process according to claim 1, wherein the enzyme is lipase.

3. A process according to claim 1, wherein the enzyme is phospholipase.

4. A process according to claim 1, wherein the enzyme is phosphatidate phosphatase.

5. A process according to claim 1, wherein the contacting of said enzyme with said carrier is performed at 20° to 30°C. and at a pH of 7 to 8.

6. A process according to claim 1, wherein the carrier is pre-treated with a hydrophilic organic solvent.

7. A process according to claim 6, wherein the organic solvent is acetone or a lower alcohol.

8. A process according to claim 1, further comprising separating the enzyme insolubilized on said carrier from said solution.

* * * * *